US006766981B2

(12) United States Patent
Volk

(10) Patent No.: US 6,766,981 B2
(45) Date of Patent: Jul. 27, 2004

(54) CONTROL SYSTEM FOR ALLEVIATING A GUST LOAD ON AN AIRCRAFT WING

(75) Inventor: John A. Volk, Monrovia, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/280,512

(22) Filed: Oct. 25, 2002

(65) Prior Publication Data

US 2004/0079835 A1 Apr. 29, 2004

(51) Int. Cl.[7] ............................................. B64C 13/16
(52) U.S. Cl. .................. 244/76 C; 244/213; 244/90 A; 244/195
(58) Field of Search ............................... 244/213, 90 R, 244/90 A, 76 R, 76 C, 194, 195; 701/3, 4, 10, 11, 12

(56) References Cited

U.S. PATENT DOCUMENTS

| 1,862,421 A | * | 6/1932 | O'Malley .................... 244/214 |
| 2,018,001 A | | 10/1935 | Zakhartchenko |
| 2,070,705 A | * | 2/1937 | Barnhart ..................... 244/214 |
| 2,263,992 A | * | 11/1941 | Joyce ........................ 244/90 A |
| 3,144,220 A | | 8/1964 | Kittelson |
| 3,734,432 A | * | 5/1973 | Low .......................... 244/76 C |
| 4,479,620 A | * | 10/1984 | Rogers et al. ............. 244/75 R |
| 4,562,546 A | * | 12/1985 | Wykes et al. ............. 244/75 A |
| 4,591,113 A | | 5/1986 | Mabey |
| 4,651,955 A | | 3/1987 | Krafka |
| 4,706,902 A | * | 11/1987 | Destuynder et al. ...... 244/76 C |
| 4,729,528 A | * | 3/1988 | Borzachillo ............... 244/75 R |
| 4,895,323 A | | 1/1990 | May |
| 4,905,934 A | | 3/1990 | Chin |
| 5,039,032 A | * | 8/1991 | Rudolph .................... 244/35 R |
| 5,082,207 A | | 1/1992 | Tulinius |
| 5,697,468 A | | 12/1997 | Russell, Jr. et al. |
| 5,740,991 A | * | 4/1998 | Gleine et al. ............... 244/213 |
| 5,921,506 A | | 7/1999 | Appa |
| 6,079,672 A | * | 6/2000 | Lam et al. .................. 244/217 |
| 6,161,801 A | | 12/2000 | Kelm et al. |
| 6,416,017 B1 | * | 7/2002 | Becker ...................... 244/76 C |

FOREIGN PATENT DOCUMENTS

EP          0 257 123 A1      3/1988

* cited by examiner

Primary Examiner—Galen L. Barefoot
(74) Attorney, Agent, or Firm—Stetina Brunda Garred & Brucker

(57) ABSTRACT

Disposed on each wing of an aircraft adjacent the wing tip is at least one deflector mechanism for twisting the wings as part of a control system for alleviating a gust load on the wing. The wing twisting is performed in conjunction with a vertical motion sensor, a sensor signal processor, and a deflector controller. The vertical motion sensor measures the vertical motion of the wing tip in response to the gust load on the wing and generates a sensor output signal. A sensor signal processor generates a deflector control signal in response to the sensor output signal. The deflector control signal represents the duration and degree of the deflector mechanism movement effective to counteract an increase in bending moment on the wing due to a gust load on the wing. A deflector controller regulates the deflector mechanism movement in response to the deflector control signal such that the deflector mechanism is alternately deployed and retracted into and out of the airstream.

29 Claims, 5 Drawing Sheets

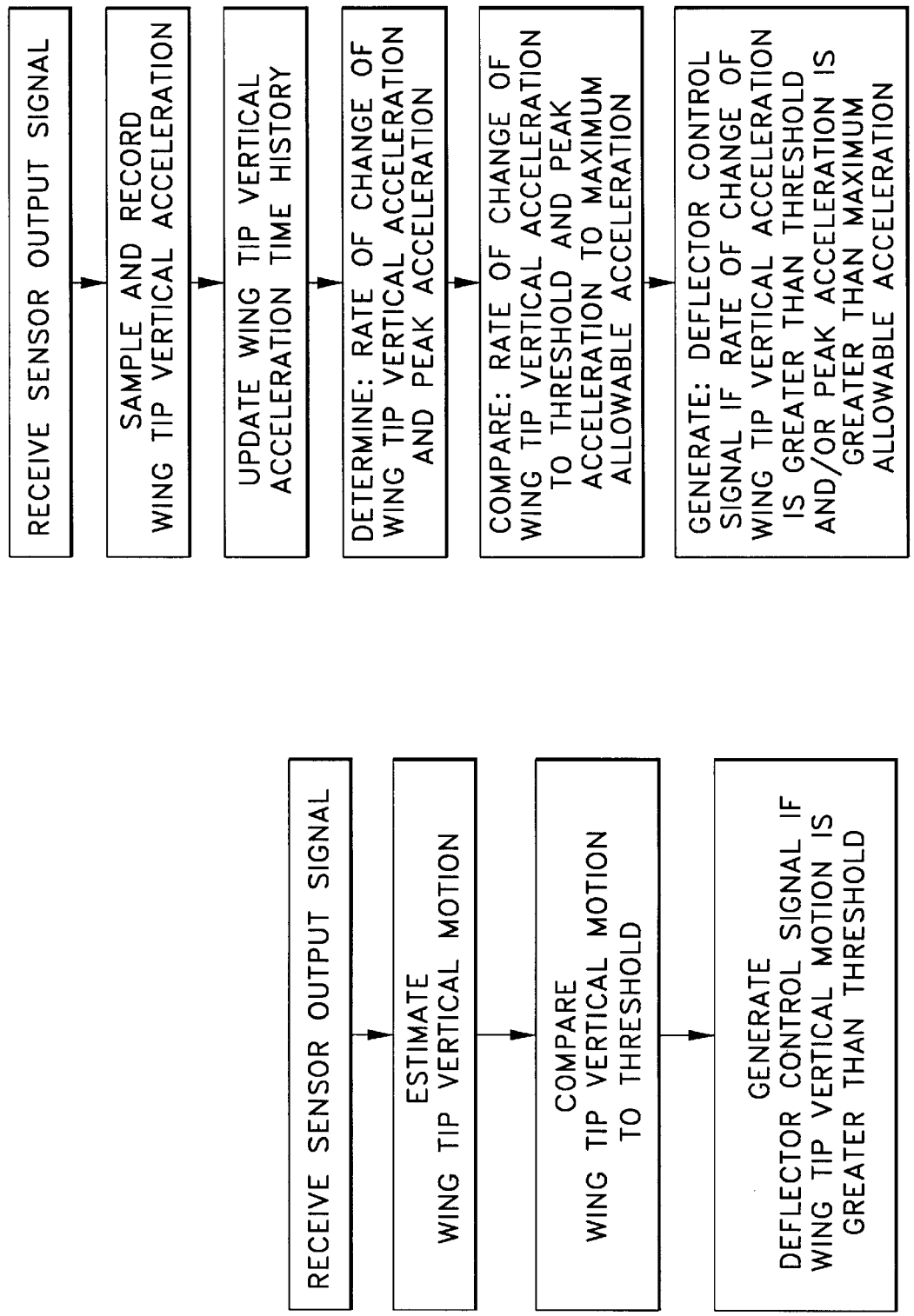

CONTROL SYSTEM FOR ALLEVIATING A GUST LOAD ON AN AIRCRAFT WING

CROSS-REFERENCE TO RELATED APPLICATIONS (Not Applicable)

STATEMENT RE: FEDERALLY SPONSORED RESEARCH/DEVELOPMENT (Need info from inventor?)

BACKGROUND OF THE INVENTION

The present invention relates generally to a control system for an aircraft and, more particularly, a control system for alleviating a gust load on an aircraft wing.

Gust load alleviation has been a major problem for aircraft designers. Gust loads are created on a wing when an aircraft encounters an upward or downward moving pocket of air, more commonly referred to as turbulence. These sudden wind gusts induce very rapid changes in the wing angle of attack, which translates into sudden increases in the wing lift. The increase in wing lift corresponds to a sudden escalation in the bending moment on the wing structure that can exceed its load-carrying capability. In the absence of a control system for alleviating gust loads, the wing structure must be strengthened to accommodate the increased bending moment. This strengthening means higher structural weight and decreased aircraft performance. However, reducing or alleviating the gust load corresponds to a reduction in the bending moment on the wing. If gust loads can be alleviated to levels at or below maneuver load thresholds, aircraft weight can be substantially reduced, resulting in improved aircraft performance such as an increase in range or payload.

It is common for aircraft with stiff, shorter span wings to utilize conventional trailing edge surfaces or spoilers for gust load alleviation. For example, on stiff wings, ailerons can be placed near the wing tip both for roll control and for alleviating gust loads. Ailerons placed at this location on stiff wings are less prone to loss of effectiveness due to wing twisting. In addition, ailerons on stiff, shorter wings can extend across a significant portion of the wing span, adding to their effectiveness. By actuating the ailerons in a symmetrical manner in the trailing edge up position, the lift on the wing is reduced and can even allow for a net downward load on the portion of the wing spanned by the aileron, thereby alleviating the effects of a gust load. However, on long endurance aircraft which typically utilize long, slender wings, ailerons typically cannot be placed at the wing tip for alleviating gust loads. This is because the wing will deform in a twisting manner when the aileron is activated, minimizing or negating the effectiveness. Long, slender wings are typically very flexible due to the long span and the need to keep the aircraft weight to a minimum. For this reason, on slender-winged aircraft, ailerons are typically placed farther inboard, minimizing their effectiveness as load alleviation devices. Thus, there is a need for a gust load alleviation device that can be utilized on aircraft with long, slender wings.

The prior art approaches to alleviating wing gust loads on an aircraft wing are numerous. The prior art describes a flight control system for an aircraft including trailing edge airfoil members pivotally mounted at the trailing edge of each wing of an aircraft and selectively movable on a laterally extending axis between raised and lowered positions for imparting rolling motion to the aircraft. Leading edge airfoil members mounted adjacent the leading edge are transversely movable between retracted positions and an extended position protruding from the leading edge for imparting countervailing aerodynamic forces on the wings to counteract the effects of aeroelastic wing deformation caused by the trailing edge airfoil members, increasing the angle of attack of the wing. A pair of actuators are mounted on a wing box member at laterally spaced locations for retracting and extending the leading edge airfoil member. The actuator mechanisms are simultaneously operable such that they are capable of extending the leading edge airfoil members with or without rotation of the leading edge airfoil in either an up or down position relative to the wing. The advantage of this flight control system is that it imparts countervailing aerodynamic forces on the wings to counteract the effects of aeroelastic wing twisting which can occur when a deflected trailing edge airfoil increases the angle of attach of the wing. The drawback of this flight control system is that it is only designed to provide leading edge up twisting to counteract the adverse effect of down twisting of an aileron, the down twisting of an aileron decreasing the aileron's roll effectiveness. In high aspect-ratio wings, up gusts such as the upward thermal drafts more commonly referred to as turbulence in commercial airliners, are more critical to the load-carrying capability of a wing than down gusts. A device that can twist a wing down is more critical in the loading capability of an aircraft than a device that can twist a wing up because the wings are already supporting at least one-G loading in order for the aircraft to maintain level flight. Although it is advantageous to have the capability to twist a wing up in order to alleviate down gusts, a device that can twist a wing down may be the only wing twisting mechanism necessary for an aircraft.

The prior art also describes a system for controlling aeroelastic deflection of the wings beyond control surface reversal. Control surface reversal occurs when high dynamic pressure on trailing edge control surfaces of a wing cause the wing to twist in the area of the control surface. Normally, differential control surface deflections cause differential lift of the opposing wings on either side of the fuselage. This differential in lift causes the aircraft to roll about its longitudinal axis, initiating a turn of the aircraft. However, at high dynamic pressure on the control surfaces, instead of causing differential lift on the opposing wings, the wing will twist so that the aircraft roll command is minimized or even negated. The system for controlling aeroelastic deflection includes flexible wings, leading and trailing edge control surfaces, a large, distributed sensor network to measure selected aircraft flight parameters, an information processing system to receive and process pilot command signals and signals from the sensors, and control mechanisms in the wing that respond to processed signals from the information processing system. The control mechanisms selectively position the control surfaces to produce loads such that the wings are deflected in a desired manner for aircraft control. The system can be used for aircraft control, maneuver performance and gust load alleviation. The advantage of this system is that its large sensor network is integrated and linked to a central flight computer so that the flight performance data is utilized in a multifunctional manner to optimize control surfaces based on both pilot commands, preprogrammed flight data such as drag and load minimizing criterion, and uncommanded flight events such as control surface flutter and gust loading events. However, the drawbacks of this system are that it is not retrofitable to existing aircraft, it is not self-contained in that it cannot be installed as a separate system at the aircraft wing tip, and it is dependent on a centralized flight control computer for actuation.

As can be seen, there is a need for a device for alleviating gust loads on an aircraft wing that can twist a wing both down and up or a mixture of both. Additionally, there is a need for a device for alleviating gust loads that is self-contained and that may be retrofittable into existing aircraft. Furthermore, there is a need for a device for alleviating gust loads on an aircraft wing that is low cost and of simple construction with a minimal number of parts. Finally, there is a need for a device for alleviating gust loads on an aircraft wing that may operate either independently of or in conjunction with a flight control computer.

BRIEF SUMMARY OF THE INVENTION

The present invention specifically addresses and alleviates the above referenced deficiencies associated with the use of gust load alleviating devices of the prior art. More particularly, the present invention is an improved gust load alleviating device that exhibits improved operability compared to devices of the prior art in that it is capable of reducing wing bending moment by twisting a wing both down and up or a mixture of both in response to gust loads. Furthermore, the gust load alleviation device is adaptable to aircraft having long, slender wings and may be retrofittable into existing aircraft.

In accordance with an embodiment of the present invention, there is provided a control system for alleviating a gust load on an aircraft wing. The control system is incorporated into an aircraft wherein a deflector mechanism acts to twist the wing in order to effect an overall reduction in the bending moment of the wing. The effect of wing twisting by the deflector mechanism is performed in conjunction with a vertical motion sensor, a sensor signal processor and a deflector controller. The vertical motion sensor measures the vertical motion of the wing tip in response to a gust load on the wing and generates a sensor output signal. A sensor signal processor generates a deflector control signal in response to the sensor output signal. A deflector controller regulates the deflector mechanism movement in response to the deflector control signal such that the deflector mechanism is alternately deployed and retracted into and out of the airstream.

In operation, during the course of the flight of the aircraft, gust and maneuver loads acting on the aircraft wing induce vertical motion of the wing tip. The vertical motion sensor senses the vertical motion of the wing tip and generates a sensor output signal. Because the rate of change of vertical acceleration of the wing tip is very slow for the maneuver load as compared to the gust load, the vertical motion sensor distinguishes the maneuver load from the gust load and only generates a sensor output signal in response to the gust load, and not in response to the maneuver load. The signal sensor processor estimates the vertical motion of the wing tip and compares the wing tip vertical motion to a preset threshold value representing the peak vertical motion due to a maneuver load. Such a maneuver load may be characterized as the load on the wing tip caused by control surface deflections during normal flight maneuvering, such as when turning the aircraft. After comparing the wing tip vertical motion to the preset threshold value, the signal sensor processor then generates a deflector control signal, but only if the wing tip vertical motion represented by the sensor output signal is greater than the threshold value.

If so, the generated deflector control signal is transmitted to the deflector controller, which regulates the deflector mechanism movement in response to the deflector control signal such that the deflector mechanism is alternately deployed and retracted into and out of the airstream at a duration and degree which is sufficient to counteract an increase in bending moment on the wing due to the gust load on the wing. The deflector controller deploys and retracts the deflector mechanism either partially or fully and for any length of time over the course of the flight of the aircraft. The deflector mechanism generates a deflector torque on the wing in response to an aerodynamic force of the airstream on the deflector mechanism. The deflector torque may effect either an upward or a downward twisting motion on the wing depending on whether the gust load effects an upward or a downward vertical motion of the wing tip. In response to a downward gust, an upward twisting of the wing increases the angle of attack of the wing locally, generating increased lift at that location which in turn increases the wing bending moment at the wing root. In response to an upward gust, a downward twisting of the wing decreases the angle of attack of the wing locally, generating decreased lift at that location which in turn decreases the wing bending moment at the wing root.

The present invention may be utilized on any aircraft wing as all aircraft wings are flexible to some degree. Furthermore, the control system may be adapted for use on aircraft with long slender wings as the smooth twisting of the wing from the wing tip to the wing root is efficient in alleviating gust loads on the wing.

BRIEF DESCRIPTION OF THE DRAWINGS

These as well as other features of the present invention will become more apparent upon reference to the drawings wherein:

FIG. 3 is a flow chart showing the functionality of the sensor signal processor of FIG. 2;

FIG. 3a is a flow chart showing the functionality of the sensor signal processor of FIG. 2 wherein the control system operates independently of a flight control computer;

DETAILED DESCRIPTION OF THE INVENTION

The present invention will now be described in particular with reference to the accompanying drawings.

Figure 1:
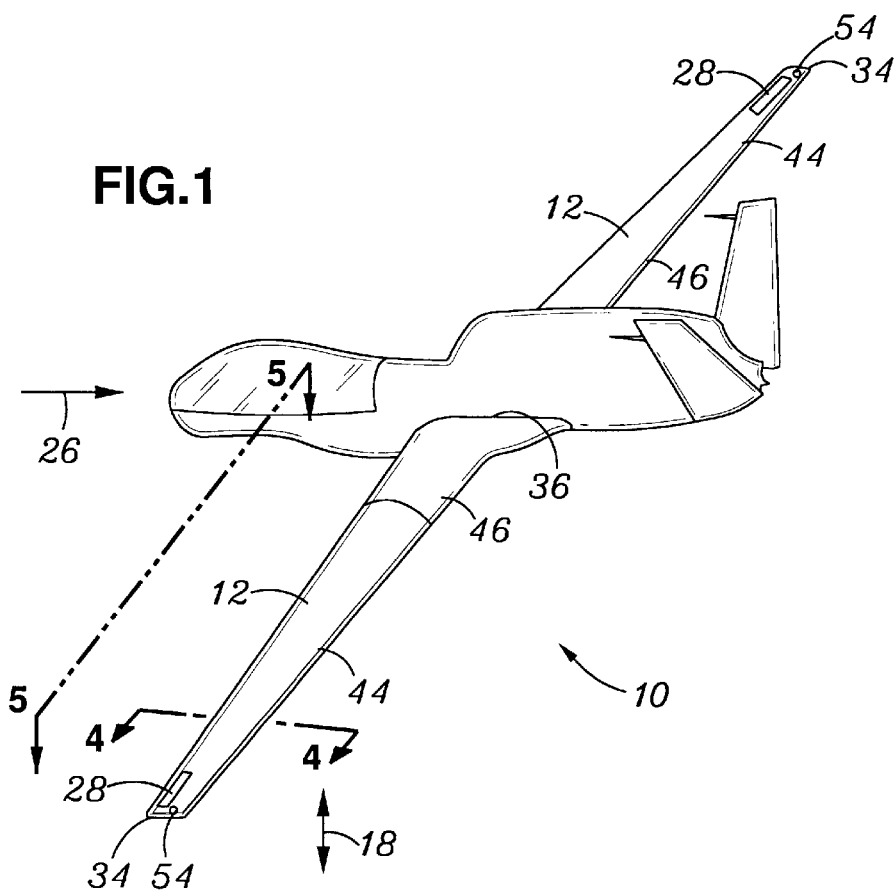
FIG. 1 is a perspective view of an aircraft which incorporates a control system for alleviating gust load on an aircraft wing of the present invention.

FIG. 1 illustrates an aircraft 10 having a pair of wings 12, the aircraft 10 operating in the airstream 26. Each wing 12 defines a wing tip 34, a wing root 36, a leading edge 44, and a trailing edge 46. Also shown in FIG. 1, disposed on each wing 12 adjacent the wing tip 34 is at least one deflector mechanism 28 as part of a control system 14 for alleviating a gust load 18 on the wing 12. As will be explained in more detail below, the deflector mechanism 28 acts to twist the wing 12 in order to effect an overall reduction in the bending moment of the wing 12. The effect of wing 12 twisting by the deflector mechanism 28 is performed in conjunction with the other major components of the control system 14, including a vertical motion sensor 54, a sensor signal processor 58, and a deflector controller 64. The vertical motion sensor 54 is shown in FIG. 1 mounted on the aircraft wing 12 adjacent the wing tip 34. As will be explained in more detail below, the vertical motion sensor 54 measures the vertical motion of the wing tip 34 in response to the gust load 18 on the wing 12 and generates the sensor output signal 56. Next, the sensor signal processor 58 (not shown in FIG. 1) generates the deflector control signal 60 in response to the sensor output signal 56. The deflector control signal 60 represents the duration and degree of the deflector mechanism 28 movement effective to counteract an increase in bending moment on the wing 12 due to the gust load 18 on the wing 12. Finally, the deflector controller 64 (also not shown in FIG. 1) regulates the deflector mechanism 28 movement in response to the deflector control signal 60 such that the deflector mechanism 28 is alternately deployed and retracted into and out of the airstream 26.

Figure 2:
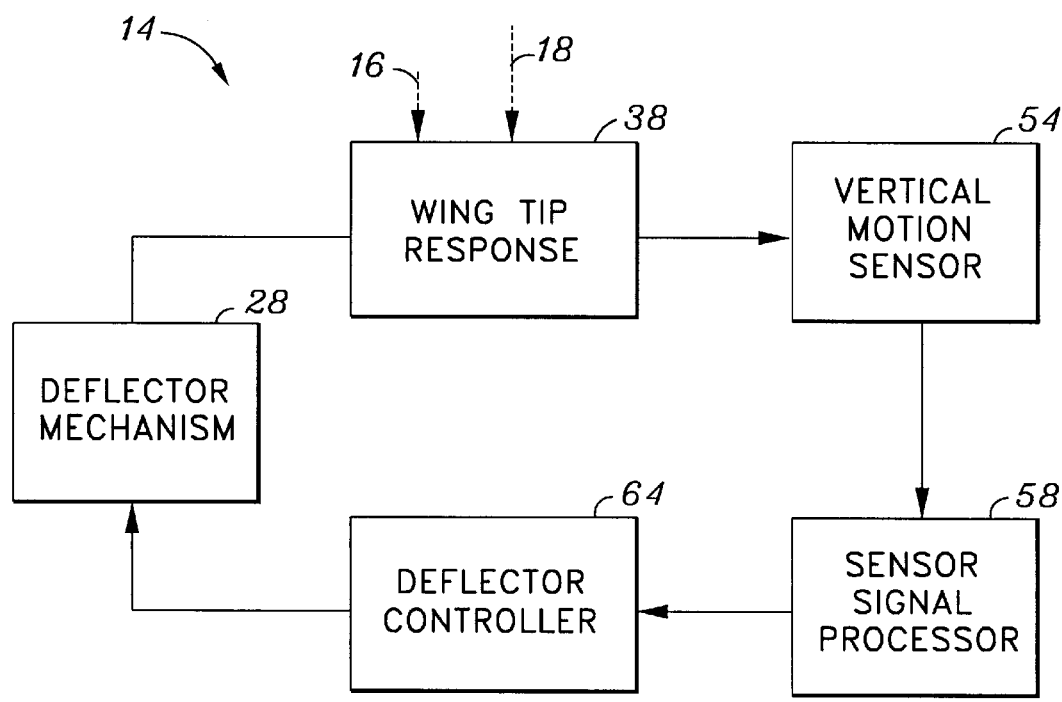
FIG. 2 is a block diagram illustrating the major components of the control system of the present invention.

In FIG. 2, a block diagram is shown which illustrates the major components of the control system 14. Shown in FIG. 2 are the gust load 18 and a maneuver load 16 acting on the aircraft wing 12 and inducing a wing tip response 38. The wing tip response 38 may be characterized as a vertical motion of the wing tip 34 due to its increased lift as caused by the gust load 18 and the maneuver load 16. The vertical motion sensor 54 senses the vertical motion of the wing tip 34 and generates the sensor output signal 56 representative of the wing tip 34 vertical motion. The vertical motion sensor 54 may be of many different varieties and may be disposed in an infinite number of locations on the aircraft 10. For example, the vertical motion sensor 54 shown in FIG. 1 is mounted on the wing 12 adjacent the wing tip 34. The vertical motion may alternately be an infrared sensor capable of detecting gusts ahead of the wing 12 and may be mounted on the forward part of the aircraft 10. However, an air pressure sensor disposed adjacent the wing tip 34 for detecting air pressure of the gust load 18 may be utilized. A linear accelerometer disposed on the wing tip 34 and oriented to measure vertical acceleration of the wing tip 34 may also suffice. The accelerometer may be configured to continuously sample the wing tip 34 vertical motion. In addition, it is anticipated that the accelerometer may sample the acceleration of the wing tip 34 at a lower or higher rates depending on the airspeed of the aircraft. Typical sampling rates may be 50 Hz for low speed aircraft and up to 500 Hz for very high speed aircraft. Regarding the quantity of vertical motion sensors 54, it is contemplated that a plurality of vertical motion sensors 54 may be disposed adjacent the deflector mechanism 28.

Regardless of its type or location, the vertical motion sensor 54 operates to distinguish the maneuver load 16 from the gust load 18 based on the difference between the wing tip response 38 due to the gust load 18 and the wing tip response 38 due to the maneuver load 16. It should also be noted that, for purposes of this discussion, the gust load 18 may effect either an upward or a downward vertical motion of the wing tip 34. An upward vertical motion of the wing tip 34 corresponds to a rapid positive change in the vertical acceleration of the wing tip 34. Conversely, a downward vertical motion of the wing tip 34 corresponds to a rapid negative change in the vertical acceleration of the wing tip 34. Because the rate of change of vertical acceleration of the wing tip 34 of long, slender-winged aircraft is very slow for the maneuver load 16 as compared to the gust load 18, the vertical motion sensor 54 distinguishes the maneuver load 16 from the gust load 18 and only generates the sensor output signal 56 in response to the gust load 18, and not in response to the maneuver load 16.

Also shown in FIG. 2 is the sensor signal processor 58. The sensor signal processor 58 is in electrical communication with the vertical motion sensor 54. It receives the sensor output signal 56 from the vertical motion sensor 54 and, based on the sensor output signal 56, determines the duration and degree of deflector mechanism 28 movement effective to counteract an increase in bending moment on the wing 12 due to the gust load 18 on the wing 12. The sensor signal processor 58 then generates a deflector control signal 60 which is representative of the duration and degree of deflector mechanism 28 movement. In the case where the vertical motion sensor 54 is an accelerometer, the sensor signal processor may determine the rate of change of the wing tip 34 vertical acceleration and generate the deflector control signal 60 when the rate of change of the wing tip 34 vertical acceleration exceeds a threshold value. In an embodiment of the present invention, the sensor signal processor 58 is capable of determining the duration and degree of deflector mechanism 28 movement completely independent of any other flight parameter input such as flight altitude, flight speed, gross flight weight of the aircraft 10, or pilot/autopilot control surface commands.

Figure 3B:
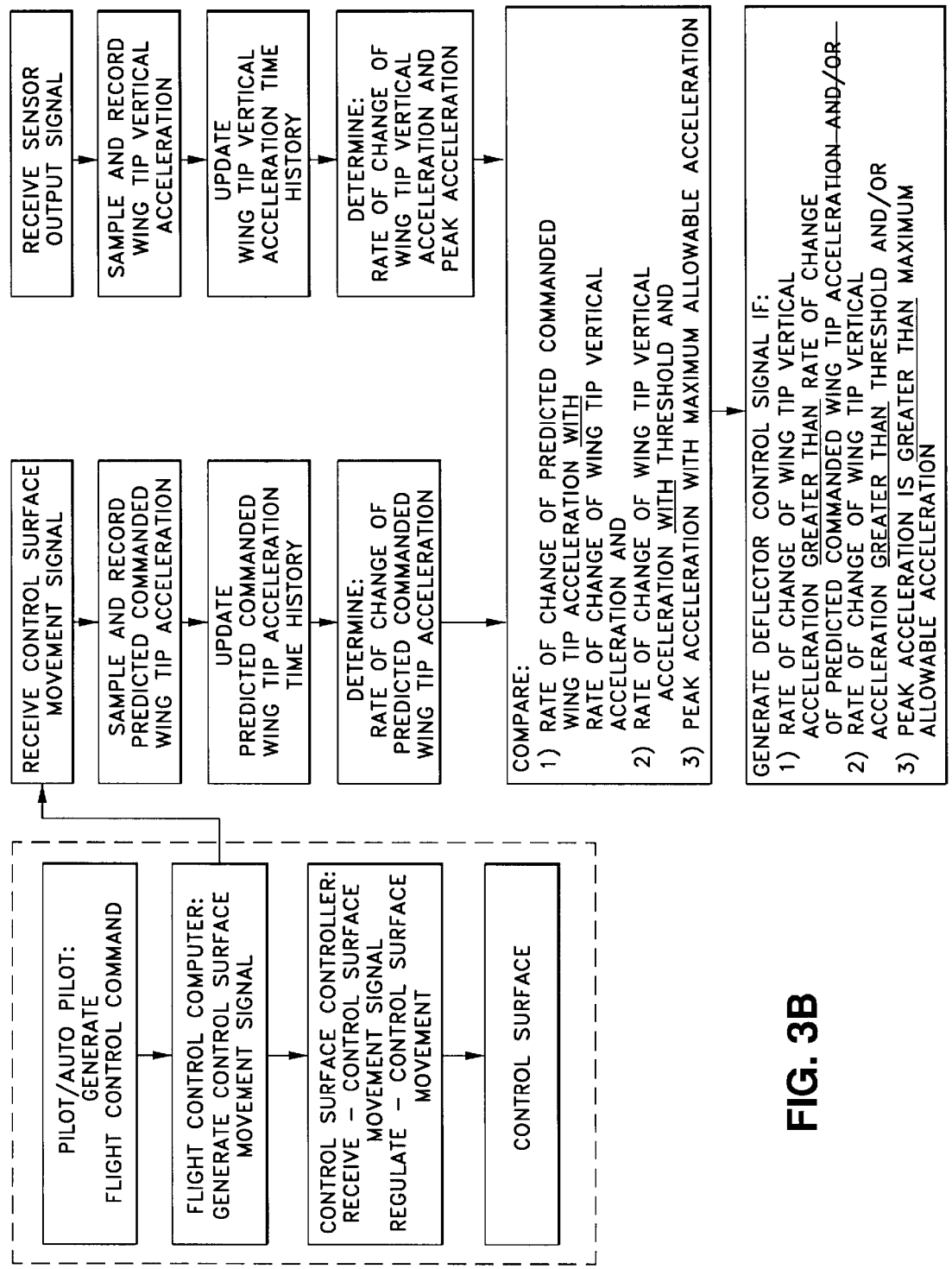
FIG. 3b is a flow chart showing the functionality of the sensor signal processor of FIG. 3a wherein the control system operates in conjunction with a flight control computer.

In an embodiment of the present invention, the sensor signal processor 58 may only receive information on the vertical motion of the wing tip 34 provided by the sensor output signal 56. However, it is contemplated that signals indicative of flight parameters may be transmitted to the sensor signal processor 58 and incorporated into the determination of the duration and degree of deflector mechanism 28 movement for alleviating gust loads 18 on the wing 12. For example, the sensor signal processor 58 may incorporate signals indicative of the wing 12 angle of attack in order to optimize the flight performance of the aircraft 10 while simultaneously reducing the bending moment on the wing 12 during climb or descent of the aircraft 10. In the case where the deflector mechanism 28 comprises both an upper and a lower deflector mechanism 30, 32 disposed on each wing 12, it is contemplated that the sensor signal processor 58 is capable of commanding the upper and lower deflector mechanism 30, 32 to operate simultaneously such that the bending moment of the wing 12 is optimized for a preprogrammed set of flight conditions. Regarding the type of sensor signal processor 58, it is contemplated that there are many configurations thereof that may be utilized in the control system 14. For example, a microprocessor may be utilized. Furthermore, a portion of a flight control computer normally utilized for processing pilot and autopilot commands for controlling the aircraft 10 may be employed to process sensor output signals 56 from the vertical motion sensor 54 and, based on the sensor output signal 56, determine the duration and degree of deflector mechanism 28 movement. Such a configuration is illustrated in FIG. 3b, described in detail below.

Referring still to the block diagram in FIG. 2, also shown is the deflector controller 64. The deflector controller 64 is in electrical communication with the sensor signal processor 58 and receives the deflector control signal 60 therefrom. The deflector controller 64 regulates the deflector mechanism 28 movement in response to the deflector control signal 60 in a manner to alternately deploy and retract the deflector mechanism 28 into and out of the airstream 26 in accordance with the deflector control signal 60. The deflector controller 64 may regulate the movement of the deflector mechanism 28 so that the deflector mechanism 28 is deployed either partially or fully. Furthermore, the deflector controller 64 may regulate the duration of deployment of the deflector mechanism 28 such that the deflector mechanism 28 may be deployed for any length of time over the course of the flight of the aircraft 10. The regulation of the deflector mechanism 28 may be such that the deflector mechanism 28 on one wing 12 is never deployed during the course of the flight while the deflector mechanism 28 on another wing 12 of the aircraft 10 may be deployed on multiple occasions during the course of the flight. In the case where the deflector mechanism 28 comprises both the upper and the lower deflector mechanism 30, 32 disposed on each wing 12, it is contemplated that the deflector controller 64 is capable of regulating the movement of the upper and the lower deflector mechanism 30, 32 simultaneously. Furthermore, the deflector controller 64 may regulate the deflector mechanism 28 movement so that the deflector mechanism 28 deploys and retracts in an infinite number of ways. For example, the deflector controller 64 may deploy and retract the deflector mechanism 28 parallel to the wing leading edge 44. Alternately, the deflector mechanism 28 may be deployed and retracted perpendicular to the airstream 26.

Figure 4A:
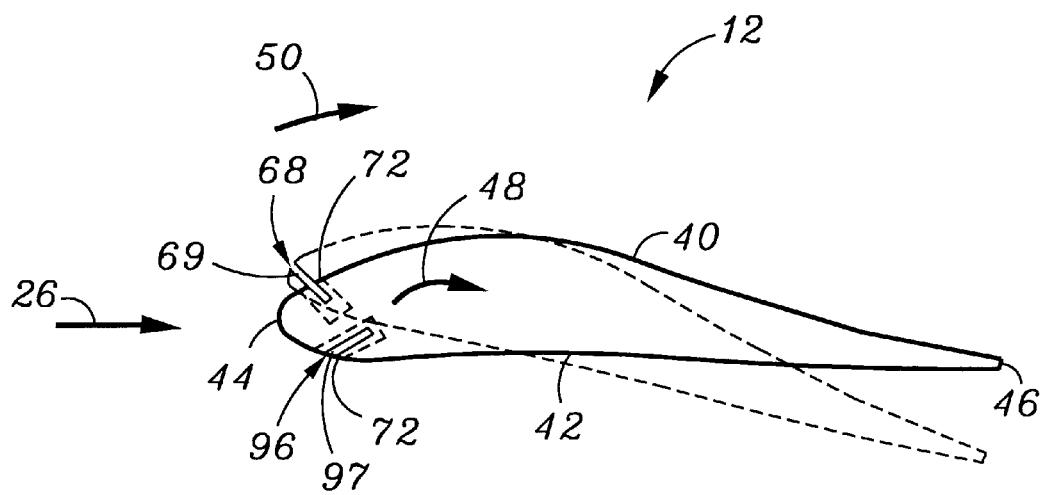
FIG. 4a is a sectional view of the aircraft wing taken along line 3—3 of FIG. 1 illustrating an embodiment of the deflector mechanism as it is incorporated into the wing.
Figure 4B:
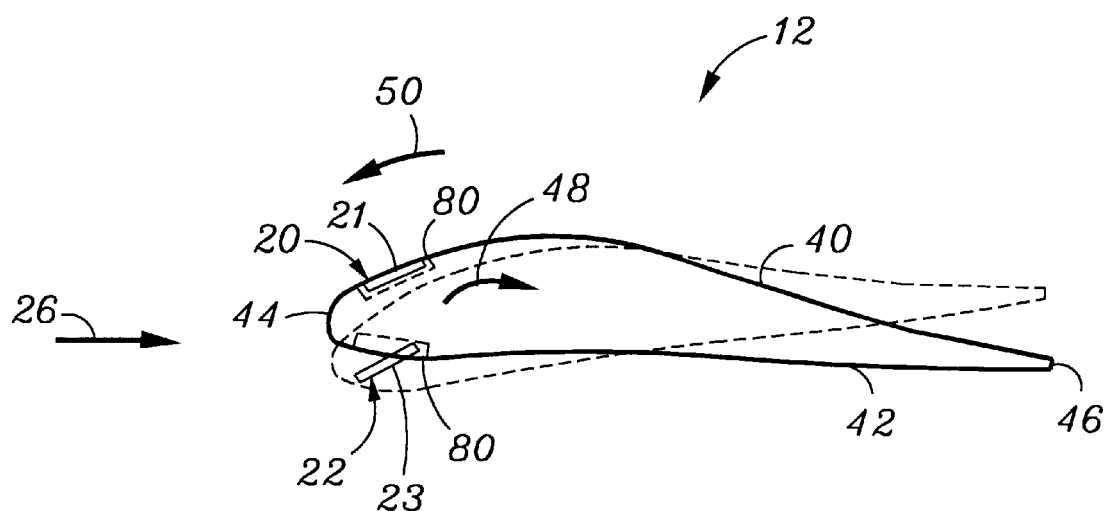
FIG. 4b is a sectional view of the aircraft wing taken along line 3—3 of FIG. 1 illustrating another embodiment of the deflector mechanism as it is incorporated into the wing.

Turning again to the block diagram of FIG. 2, also shown is the deflector mechanism 28. The deflector mechanism 28 generates a deflector torque 48 on the wing 12 in response to an aerodynamic force of the airstream 26 on the deflector mechanism 28. As shown in FIGS. 4a and 4b, the deflector torque 48 effects the twisting motion 50 on the wing leading edge 44 which locally increases or decreases the angle of attack of the wing 12. The deflector mechanism 28 may effect either the upward or the downward twisting motion 50 on the wing 12 depending on whether the gust load 18 effects an upward or a downward vertical motion of the wing tip 34 as sensed by the vertical motion sensor 54. FIG. 4a illustrates the condition where the upward twisting motion 50 is a desired response to counteract a downward vertical motion of the wing tip 34. In that condition, upward twisting of the wing 12, indicated in dashed lines, increases the angle of attack of the wing 12 locally. An upward twisted wing 12 generates increased lift at that location which in turn increases the wing 12 bending moment at the wing root 36. Conversely, FIG. 4b illustrates the condition where the downward twisting motion 50 is a desired response to an upward vertical motion of the wing tip 34. In that condition, the downward twisting of the wing 12, indicated in dashed lines, decreases the angle of attack of the wing 12 locally, such as in the area adjacent the wing tip 34. The downward twisted wing 12 generates decreased lift at that location. This in turn decreases the wing 12 bending moment at the wing root 36. However, as mentioned above, it is contemplated that in the case where each wing 12 has the upper and the lower deflector mechanism 30, 32, both deflector mechanisms 30, 32 may be deployed simultaneously at varying degrees and of varying durations in order to optimize the wing 12 bending moment.

FIG. 3 is a flow chart showing the functionality of the sensor signal processor 58 of FIG. 2. In FIG. 3, the sensor output signal 56 is received by sensor signal processor 58. The signal sensor processor 58 then estimates the vertical motion of the wing tip 34. If the vertical motion sensor 54 is an accelerometer, then the wing tip 34 motion may be represented as an acceleration value. The signal sensor processor 58 compares the wing tip 34 vertical motion to a preset threshold value representing the peak vertical motion due to the maneuver load 16. Such a maneuver load 16 may be characterized as the load on the wing tip 34 caused by control surface deflections during normal flight maneuvering, such as when turning the aircraft 10. After comparing the wing tip 34 vertical motion to the preset threshold value, the signal sensor processor 58 then generates the deflector control signal 60, but only if the wing tip 34 vertical motion represented by the sensor output signal 56 is greater than the threshold value. If so, the generated deflector control signal 60 is transmitted to the deflector controller 64, which regulates the deflector mechanism 28 movement in response to the deflector control signal 60 such that the deflector mechanism 28 is alternately deployed and retracted into and out of the airstream 26.

FIG. 3a is a flow chart showing the functionality of the sensor signal processor 58 of FIG. 2 wherein the control system 14 operates independently of a flight control computer. The control system 14 of FIG. 3a includes an accelerometer as the vertical motion sensor 54 and the sensor signal processor 58 operates by utilizing a rate of change of wing tip 34 vertical acceleration. It is also contemplated that the accelerometer may be a linear accelerometer. The accelerometer senses vertical acceleration of the wing tip 34 as induced by the gust load 18. The sensor output signal 56 representative of the wing tip 34 vertical acceleration is generated by the accelerometer. The sensor output signal 56 is received by sensor signal processor 58. The signal sensor processor 58 then records the sensor output signal 56. The signal sensor processor 58 may be configured to continuously sample the vertical acceleration of the wing tip 34 with such a frequency that will allow for the timely deployment and retraction of the deflector mechanism 28 effective to counteract gust induced increases in the bending moment on the wing 12. For example, it is contemplated that the signal sensor processor 58 may continuously sample the acceleration of the wing tip 34 with a frequency of 50 Hertz which may be suitable for aircraft that operate at low airspeeds. Alternately, the signal sensor processor 58 may continuously sample the acceleration of the wing tip 34 with a frequency of 500 Hertz. The higher sampling rate would be compatible for aircraft that operate at high speeds. The sensor signal processor 58 updates the wing tip 34 vertical acceleration time history by continuously recording the wing tip 34 vertical acceleration. Based on the wing tip 34 vertical acceleration time history, the sensor signal processor 58 determines a rate of change of the wing tip 34 vertical acceleration and a peak acceleration of the wing tip 34. The peak acceleration is based on the time history and represents the highest acceleration recorded by the signal sensor processor 58.

The sensor signal processor 58 then compares the rate of change of the wing tip 34 vertical acceleration with a threshold value, the threshold value representative of wing tip 34 vertical motion that is induced by the maneuver load 16 on the wing 12. Coincidentally, the sensor signal processor 58 also compares the peak acceleration to a predetermined maximum allowable acceleration. The predetermined maximum allowable acceleration may be based on the structural capability of the aircraft 10 and represents the maximum loading on the aircraft 10. It is contemplated that the maneuver load 16 may be measured in terms of the current G loading on the wing tip 34 and that the control system 14 of the present invention may be programmed to alleviate any gust loads 18 on the wing 12 greater than about two positive G's. After comparing the rate of change of the wing tip 34 vertical acceleration to the preset threshold value and comparing the peak acceleration to the predetermined maximum allowable acceleration, the signal sensor processor 58 then generates the deflector control signal 60 if either the rate of change of the wing tip 34 vertical acceleration represented by the sensor output signal 56 is greater than the threshold value or if the peak acceleration is greater than the predetermined maximum allowable acceleration. The control deflector control signal 60 may also be generated if both the rate of change of the wing tip 34 vertical acceleration represented by the sensor output signal 56 is greater than the threshold value and if the peak acceleration is greater than the predetermined maximum allowable acceleration. If either condition is met, then similar to the operation of the control system 14 in FIG. 3, the deflector control signal 60 is generated which is representative of the duration and degree of the deflector mechanism 28 movement effective to counteract an increase in bending moment on the wing 12 due to the gust load 18 on the wing 12.

The generated deflector control signal 60 is transmitted to the deflector controller 64, which regulates the deflector mechanism 28 movement in response to the deflector control signal 60 such that the deflector mechanism 28 is alternately deployed and retracted into and out of the airstream 26. The deflector mechanism 28 generates a deflector torque that imparts a twisting motion of the wing 12. It is contemplated that the operation of the sensor signal processor 58 described in FIG. 3*a* is adaptable for aircraft that have very low maneuver load 16 limits, such as 2.0 positive G's or less. It is also contemplated that the control system 14 described in FIG. 3*a* may be implemented on an aircraft wing that is flexible. Although the control system 14 described in FIG. 3*a* represents an arrangement wherein the control system 14 operates independent of a flight control computer, it is contemplated that the control system 14 may be integrated with the flight control computer, as illustrated in FIG. 3*b* and described below.

FIG. 3*b* is a flow chart showing the functionality of the sensor signal processor 58 of FIG. 3*a* wherein the control system 14 operates in conjunction with a flight control computer. In FIG. 3*b*, the sensor signal processor 58 may be integrated with the flight control computer. A flight control command is generated by a pilot or by autopilot. The flight control computer receives the flight control command and generates a control surface movement in response thereto. The aircraft 10 may include a control surface controller that receives the control surface movement signal and regulates control surfaces of the aircraft in response thereto. However, as opposed to the system illustrated in FIG. 3*a* which receives only sensor output signals 56, the signal sensor processor of FIG. 3*b* also receives both sensor output signals 56 and the control surface movement signal. The signal sensor processor samples and records a predicted commanded wing tip 34 acceleration in response to the control surface movement signal. The continuous sampling of the vertical acceleration of the wing tip 34 may be of such a frequency that will allow for the timely deployment and retraction of the deflector mechanism 28 effective to counteract gust induced increases in the bending moment on the wing 12. As mentioned above, a frequency of 50 Hertz may be suitable for aircraft that operate at low airspeeds whereas a sampling frequency of 500 Hertz would be compatible for aircraft that operate at high speeds. The sensor signal processor 58 then updates the predicted commanded wing tip 34 vertical acceleration time history. Based on the predicted commanded wing tip 34 vertical acceleration time history, the sensor signal processor 58 then estimates a rate of change of the predicted commanded wing tip 34 vertical acceleration.

Simultaneous with the processing of the rate of change of the predicted commanded wing tip 34 vertical acceleration, the sensor signal processor 58 samples and records the sensor output signal 56. In addition, the sensor signal processor 58 also determines the peak acceleration based on the time history in a manner similar to that described above for FIG. 3*a*. The sensor signal processor 58 then compares the rate of change of the wing tip 34 vertical acceleration with the threshold value and with the predicted commanded wing tip 34 vertical acceleration. As described in FIG. 3*a*, the threshold value is representative of wing tip 34 vertical motion that is induced by the maneuver load 16 on the wing 12. The sensor signal processor 58 also compares the peak acceleration with the predetermined maximum allowable acceleration. As mentioned above, the peak acceleration is based on the time history and represents the highest acceleration recorded by the signal sensor processor 58. The deflector control signal 60 is generated if the rate of change of the wing tip 34 vertical acceleration is greater than either the threshold value or the rate of change of the predicted commanded wing tip 34 vertical acceleration or if the peak acceleration is greater than the predetermined maximum allowable acceleration. Alternately, the deflector control signal 60 may be generated if the rate of change of the wing tip 34 vertical acceleration is greater than both the threshold value and the rate of change of the predicted commanded wing tip 34 vertical acceleration and if the peak acceleration is greater than the predetermined maximum allowable acceleration as described above for FIG. 3*a*. If either condition is met, the deflector control signal 60 is transmitted to the deflector controller 64, which regulates the deflector mechanism 28 movement in response to the deflector control signal 60 such that the deflector mechanism 28 is alternately deployed and retracted into and out of the airstream 26. It is contemplated that the operation of the sensor signal processor 58 described in FIG. 3*b* may be effective to better distinguish gust loads 18 from maneuver loads 16 than that described in FIG. 3*a*. The system described in FIG. 3*b* may be adaptable for aircraft that have maneuver load 16 limits greater than 2.0 positive G's. Also, it is contemplated that the control system 14 described in FIG. 3*b* may be implemented on an aircraft wing that is flexible.

By integrating the control system 14 with a flight control computer as illustrated in FIG. 3*b*, the control system 14 may be more effective in alleviating gust loads 18 on the wing 12 due to the capability of sensing changes in the operating parameters of the aircraft 10. For example, maneuver load 16 limits may vary with changes in the gross weight of the aircraft 10 during the course of the flight. The gross weight of the aircraft 10 may decrease as fuel carried by the aircraft 10 is burned. The amount of remaining fuel may be used to determine the load limit at any point during the flight. The flight control computer may feed commanded wing tip 34 acceleration data to the sensor signal processor 58, increasing the simplicity and reliability of the sensor signal processor 58 in distinguishing the maneuver load 16 from the gust load 18 as the aircraft 10 operating parameters change over the course of the flight.

FIGS. 4a and 4b are sectional views of the aircraft wing 12 taken along line 3—3 of FIG. 1 illustrating embodiments of the deflector mechanism 28 and their respective incorporations into the wing 12. FIG. 4a illustrates an embodiment wherein the deflector mechanism 28 is a first slat 68 and a second slat 96. The first slat 68 is disposed on an upper surface 40 of the leading edge 44 adjacent the wing tip 34. The second slat 96 may be disposed on a lower surface 40, 42 of the leading edge 44 adjacent the wing tip 34. The first and second slats 68, 96 may be deployed out of a receiving pair of wing slots 72 in the wing 12. The wing slots 72 may be configured so that the outer surfaces 69, 97 of the slats 68, 96 are flush with the upper and lower surface 40, 42 of the wing 12 when retracted. Alternately, each of the first and second slats, 68, 96 may be comprised of a plurality of elongate slat members 74 aligned end to end, the elongate slat members 74 configured to avoid operational interference therebetween while the wing 12 is bending in response to maneuver loads 16 or gust loads 18. FIG. 4b illustrates an embodiment wherein the deflector mechanism 28 is an upper and a lower spoiler, 20, 22, each having a trailing edge that is hinged to the wing 12 proximate the wing leading edge. The upper spoiler 20 may be disposed on the upper surface 40 of the leading edge 44 adjacent the wing tip 34. The lower spoiler 22 may be disposed on the lower surface 42 of the leading edge 44 adjacent the wing tip 34. In addition, the upper and lower spoiler 20, 22 may be forward facing. The upper and lower spoiler, 20, 22 may be sized and configured in a number of ways. For example, the upper and lower spoiler may be configured to be deployed out of a receiving pair of spoiler recesses 80 in the wing 12 such that the outer surfaces of the spoilers 20, 22 are flush with the upper and lower surfaces 40, 42 of the wing 12 when retracted.

In yet another embodiment, not shown, the deflector mechanism 28 may be an aileron 82 disposed at the trailing edge 46 of the wing 12 adjacent the wing tip 34. The aileron 82 may be utilized in a non-conventional manner to impart the upward or downward twisting motion 50 on the wing 12 locally whereas ailerons 82 are conventionally utilized on the wing 12 to provide roll control for maneuvering the aircraft 10, and not to control the wing 12 bending moment. The aileron 82 utilized in such a non-conventional manner of wing 12 twisting would operate when sufficient aerodynamic force acting on the aileron 82 would impart the twisting motion 50 to the wing 12 locally. It is recognized that there are a number of shapes, sizes, configurations, and arrangements for the deflector mechanism 28 that may be utilized for twisting the wing 12 locally in order to control the wing 12 bending moment. Additionally, there are a number of placements of the deflector mechanism 28 that may be workable. For example, although shown at a position on the wing 12 adjacent the wing tip 34, the deflector mechanism 28 may be an arrangement wherein the elongate slate members 74 are distributed along the wing 12 from the wing tip 34 to the wing root 36. Furthermore, it is anticipated that the plurality of elongate slate members 74 may be distributed along the wing 12 from the wing tip 34 to a location about midway between the wing tip 34 and the wing root 36.

It should be noted that although the control system 14 of the present invention may be utilized on any aircraft wing as all aircraft wings are flexible to some degree, the present invention may be adapted for use on a flexible wing. Furthermore, it is contemplated that the control system 14 of the present invention may be adapted for use in aircraft with long slender wings as the smooth twisting of the wing 12 from the wing tip 34 to the wing root 36 is efficient in alleviating gust loads 18 on the wing 12. For conventional wings such as those on fighter aircraft, large forces are required to induce local wing twisting. However, long slender wings such as those utilized by the aircraft 10 illustrated in FIG. 1 are typically highly flexible and can be easily twisted.

Figure 5:
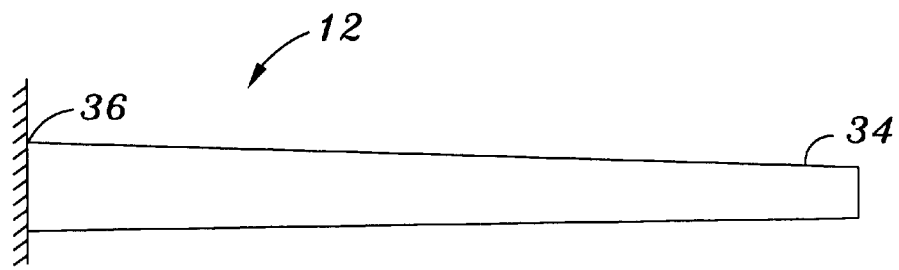
FIG. 5 is a plan view of the aircraft wing taken along line 5—5 of FIG. 1.
Figure 6:
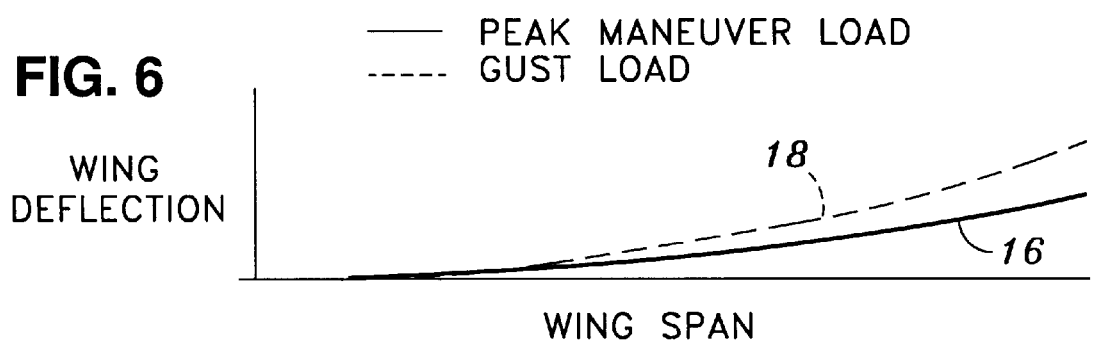
FIG. 6 is a graph of wing deflection vs. wing span for the wing of FIG. 5 illustrating the increase in wing deflection due to the addition of the gust load on the wing.
Figure 7:
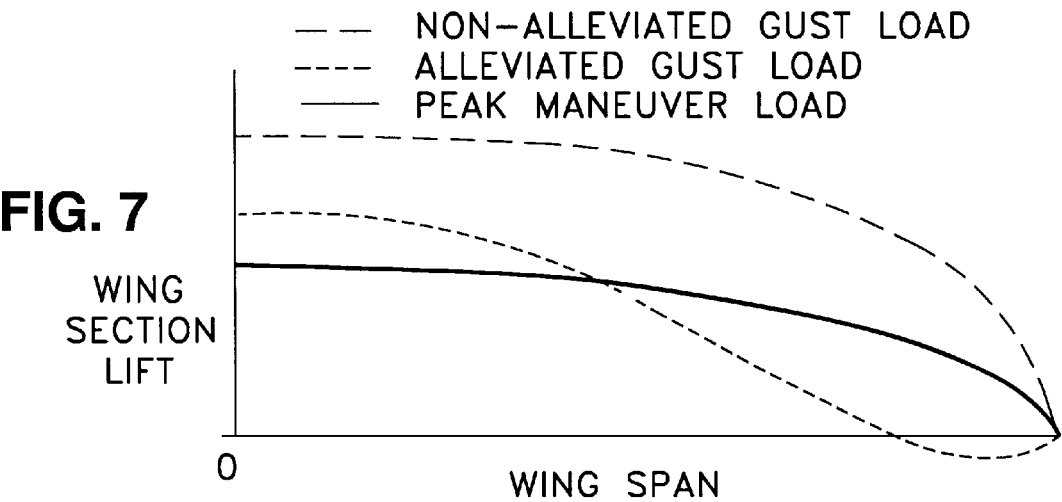
FIG. 7 is a graph of wing section lift vs. wing span for the wing of FIG. 5 illustrating the difference between the span loading for peak maneuver load vs. alleviated gust loads vs. non-alleviated gust loads.
Figure 8:
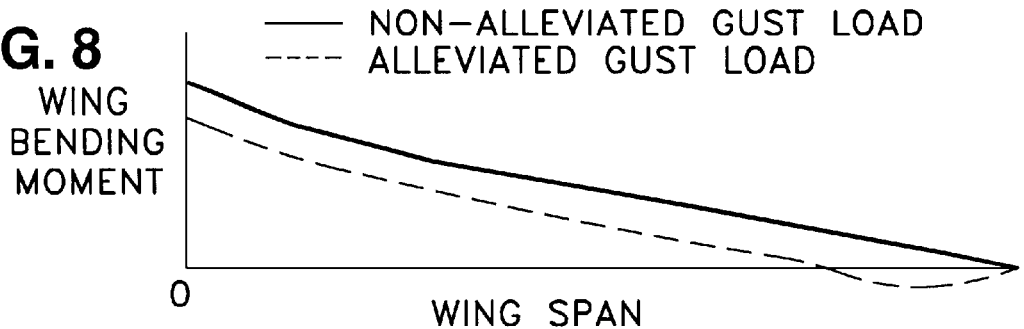
FIG. 8 is a graph of wing bending moment vs. wing span for the wing of FIG. 5 illustrating the effect of gust load alleviation on the wing bending by wing twisting.

FIG. 5 is a plan view of the wing 12 of the aircraft 10 of FIG. 1 showing the wing tip 34 and the wing root 36. FIGS. 6, 7 and 8 are graphs illustrating wing 12 performance for gust loads 18 as compared to maneuver loads 16. Referring more particularly now to FIG. 6, shown is a graph of wing deflection vs. wing span for the wing 12 of FIG. 5 illustrating the increase in wing deflection due to the addition of the gust load 18 to the peak maneuver load 16. As mentioned above, the gust load 18 briefly increases the lift on the wing 12 which can result in a bending moment on the wing 12 structure that can exceed its load-carrying capability. In the absence of the control system 14 for alleviating gust loads 18 on the wing 12, the wing 12 structure must be strengthened to accommodate the increased bending moment on the wing 12 resulting in additional structural weight and decreased aircraft 10 performance. Reduction of gust loads 18 translates into a reduction in the bending moment on the wing 12 which allows for reduced vehicle weight or an improvement in flight performance such as an increase in range or payload. Referring more particularly now to FIG. 7, shown is a graph of wing section lift vs. wing span for the wing 12 of FIG. 5 illustrating the difference between the span loading for peak maneuver loads vs. alleviated gust loads vs. non-alleviated gust loads. As can be seen, the non-alleviated span loading profile is similar to the maneuver load profile, although the wing 12 section lift is at a substantially higher level. However, as can also be seen, the alleviated gust loading profile shifts the load distribution strongly inboard. Referring more particularly now to FIG. 8, shown is a graph of wing bending moment vs. wing span for the wing 12 of FIG. 5 illustrating the effect of gust load 18 alleviation on the wing 12 bending by wing twisting. The operation of the control system 14 of the present invention alleviates gust loads 18 on the wing 12 which in turn biases the load distribution inboard. The inboard biased load distribution reduces the bending moment on the wing 12, particularly near the wing root 36. As previously mentioned, this allows for reduced vehicle weight or an improvement in flight performance for the aircraft 10.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A control system for alleviating a gust load on an aircraft wing having upper and lower surfaces, a leading edge, a wing tip and wing slots, the control system comprising:

a first slat and a second slat each having outer surfaces and being linearly reciprocatable out of a receiving pair of the wing slots formed in the upper and lower surfaces of the leading edge of the wing adjacent the wing tip, the first and second slats being outwardly deployable from the wing slots for generating a deflector torque on the wing such that the deflector torque effects a twisting motion thereon, the first and second slats being retractable into the wing slots such that the outer surfaces of the first and second slats are substantially flush with the upper and lower surfaces of the wing;

a vertical motion sensor mounted proximate the wing for sensing vertical motion of the wing tip in response to the gust load on the wing and generating a sensor output signal in response thereto;

a sensor signal processor in electrical communication with the vertical motion sensor for generating a deflector control signal in response to the sensor output signal, the deflector control signal being representative of the duration and degree of first and second slat movement; and a deflector controller in electrical communication with the sensor signal processor for regulating the first and second slat movement in response to the deflector control signal such that the first and second slats are selectively deployed and retracted in response to the deflector control signal.

2. The control system of claim 1 wherein the sensor signal processor generates a deflector control signal only when the vertical motion of the wing tip exceeds a threshold value, the threshold value being representative of wing tip vertical motion induced by a maneuver load on the wing.

3. The control system of claim 1 wherein the wing is a flexible wing.

4. The control system of claim 1 wherein the duration and degree of first and second slat movement is effective to counteract an increase in bending moment on the wing due to the gust load on the wing.

5. The control system of claim 1 wherein the deflector torque effects a downward twisting motion on a leading edge of the wing when the gust load effects an upward vertical motion of the wing tip.

6. The control system of claim 1 wherein the deflector torque effects an upward twisting motion on a leading edge of the wing when the gust load effects a downward vertical motion of the wing tip.

7. The control system of claim 1 wherein the vertical motion sensor is an accelerometer disposed on the wing tip.

8. The control system of claim 7 wherein the accelerometer is a linear accelerometer oriented to measure vertical acceleration of the wing tip.

9. The control system of claim 8 wherein the sensor signal processor determines the rate of change of the wing tip vertical acceleration and generates a deflector control signal when the rate of change of the wing tip vertical acceleration exceeds a threshold value.

10. The control system of claim 1 wherein the deflector controller is operative to selectively deploy and retract the first and second slats simultaneously.

11. The control system of claim 1 wherein the first and second slat movement is parallel to the wing leading edge.

12. The control system of claim 1 wherein the first and second slat movement is perpendicular to the air stream.

13. The control system of claim 1 wherein each of the first and second slats is formed as a plurality of aligned elongate slat members, the elongate slat members being spaced and configured to avoid operational interference therebetween as the wing bends in response to vertical motion of the wing tip and operation of the deflector mechanism.

14. The control system of claim 13 wherein the wing defines a wing root, the plurality of elongate slat members being distributed along the wing from the wing tip to the wing root.

15. The control system of claim 14 wherein the plurality of elongate slat members are distributed along the wing from the wing tip to a location about midway between the wing tip and the wing root.

16. The control system of claim 1 wherein the first and second slats are forward facing when outwardly deployed.

17. A method for alleviating a gust load on an aircraft wing having upper and lower surfaces, a leading edge, a wing tip and wing slots, the aircraft having first and a second slat each having outer surfaces and being linearly reciprocatable out of a receiving pair of the wing slots formed in the upper and lower surfaces of the leading edge adjacent the wing tip, the first and second slats being outwardly deployable from the wing slots, the method comprising:

sensing vertical motion of the wing tip produced by the gust load on the wing;

generating a sensor output signal representative of the wing tip vertical motion;

determining the duration and degree of the first and second slat movement in response to the sensor output signal, the first and second slat movement being effective to counteract an increase in bending moment on the wing due to the gust load on the wing;

generating a deflector control signal to bring about the first and second slat movement;

regulating the first and second slat movement in response to the deflector control signal in a manner to outwardly deploy the first and second slats from the wing slots and generate a deflector torque such that the deflector torque imparts a twisting motion on the wing; and retracting the first and second slats into the wing slots such that the outer surfaces of the first and second slats are substantially flush with the upper and lower surfaces of the wing.

18. The method of claim 17 further comprising the steps of recording the vertical motion of the wing tip, comparing the wing tip vertical motion to a threshold value, the threshold value being representative of wing tip vertical motion induced by a maneuver load on the wing, and wherein the deflector control signal is generated only when the vertical motion of the wing tip exceeds the threshold value.

19. The method of claim 17 wherein the deflector torque effects a downward twisting motion on a leading edge of the wing when the gust load effects an upward vertical motion on the wing tip.

20. The method of claim 17 wherein the deflector torque effects an upward twisting motion on a leading edge of the wing when the gust load effects a downward vertical motion on the wing tip.

21. The method of claim 17 wherein the aircraft wing is a flexible wing.

22. A method for alleviating a gust load on an aircraft wing having upper and lower surfaces, a leading edge, a wing tip and wing slots, the aircraft having first and a second slat each having outer surfaces and being linearly reciprocatable out of a receiving pair of the wing slots formed in the upper and lower surfaces of the leading edge adjacent the wing tip, the method comprising:

sensing vertical acceleration of the wing tip produced by the gust load on the wing;

generating a sensor output signal representative of the wing tip vertical acceleration;

recording the sensor output signal;

updating a time history of the sensor output signal;

determining a rate of change of the wing tip vertical acceleration representative of the time history of the sensor output signal;

comparing the rate of change of the wing tip vertical acceleration to a threshold value, the threshold value being representative of the wing tip vertical motion induced by a maneuver load on the wing tip;

generating a deflector control signal only when the rate of change of the wing tip vertical acceleration is greater than the threshold value, the deflector control signal being representative of the duration and degree of the first and second slat movement effective to counteract an increase in bending moment on the wing due to the gust load on the wing;

regulating the first and second slat movement in response to the deflector control signal in a manner to outwardly deploy the first and second slats from the wing slots and generate a deflector torque such that the deflector torque imparts a twisting motion on the wing; and retracting the first and second slats into the wing slots such that the outer surfaces of the first and second slats are substantially flush with the upper and lower surfaces of the wing.

23. The method of claim 22 further comprising the steps of determining the peak acceleration based on the time history, comparing the peak acceleration to a predetermined maximum allowable acceleration, and generating a deflector control signal when either the rate of change of the wing tip vertical acceleration is greater than the threshold value or the peak acceleration is greater than the predetermined maximum allowable acceleration.

24. The method of claim 23 wherein a flight control command is generated by a pilot or autopilot, the method further including the steps of:

generating a control surface movement signal representative of the flight control command;

estimating a predicted commanded wing tip acceleration in response to the control surface movement signal;

recording the predicted commanded wing tip acceleration;

updating a time history of the predicted commanded wing tip acceleration;

determining a rate of change of the predicted commanded wing tip acceleration representative of the time history of the predicted wing tip acceleration;

comparing the rate of change of the predicted commanded wing tip acceleration to the rate of change of the wing tip vertical acceleration;

generating a deflector control signal when the rate of change of the wing tip vertical acceleration is greater than either the threshold value or the rate of change of the predicted commanded wing tip vertical acceleration.

25. The method of claim 22 wherein the aircraft wing is a flexible wing.

26. An aircraft adapted to alleviate a gust load, the aircraft comprising:

a fuselage;

a pair of wings extending outwardly from the fuselage, each one of the wings having upper and lower surfaces, a leading edge, a wing tip and wing slots; and a first slat and a second slat being mounted on each of the wings, each one of the first and second slats having an outer surface and being linearly reciprocatable out of a receiving pair of the wing slots formed in the upper and lower surfaces of the leading edge of each one of the wings adjacent the wing tip, the first and second slats being outwardly deployable from the wing slots for generating a deflector torque on the wings such that the deflector torque effects a twisting motion thereon, each one of the first and second slats being retractable within the respective wings such that the outer surfaces are substantially flush with the upper and lower surfaces.

27. The aircraft of claim 26 wherein the wings are flexible wings.

28. The aircraft of claim 26 wherein the deflector torque effects a downward twisting motion on the leading edges of the wings when the gust load effects an upward vertical motion of the wing tips.

29. The aircraft of claim 26 wherein the deflector torque effects an upward twisting motion on the leading edges of the wings when the gust load effects a downward vertical motion of the wing tips.

* * * * *